(12) United States Patent
Wo et al.

(10) Patent No.: US 11,249,957 B2
(45) Date of Patent: Feb. 15, 2022

(54) FILE STORAGE METHOD AND STORAGE APPARATUS

(71) Applicant: Huawei Technologies Co., Ltd., Guangdong (CN)

(72) Inventors: Tianyu Wo, Beijing (CN); Lian Du, Beijing (CN); Xin Bai, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 36 days.

(21) Appl. No.: 16/687,070

(22) Filed: Nov. 18, 2019

(65) Prior Publication Data

US 2020/0081869 A1 Mar. 12, 2020

Related U.S. Application Data

(63) Continuation of application No. PCT/CN2018/086342, filed on May 10, 2018.

(30) Foreign Application Priority Data

May 19, 2017 (CN) .......................... 201710360832.8

(51) Int. Cl.
| | |
|---|---|
| *G06F 12/00* | (2006.01) |
| *G06F 16/00* | (2019.01) |
| *G06F 16/185* | (2019.01) |
| *G06F 16/11* | (2019.01) |
| *G06F 16/13* | (2019.01) |

(52) U.S. Cl.
CPC .......... *G06F 16/185* (2019.01); *G06F 16/116* (2019.01); *G06F 16/13* (2019.01)

(58) Field of Classification Search
CPC .. G06F 16/10; G06F 21/6218; G06F 9/45558; G06F 16/13
See application file for complete search history.

(56) References Cited

U.S. PATENT DOCUMENTS

| | | | |
|---|---|---|---|
| 9,134,917 B2 | 9/2015 | Kimmel et al. | |
| 9,218,135 B2 * | 12/2015 | Miller | .................. G06F 3/0644 |
| 2004/0177319 A1 * | 9/2004 | Horn | ....................... G06F 16/26 |
| | | | 715/205 |
| 2008/0270697 A1 | 10/2008 | Ueoka et al. | |

(Continued)

FOREIGN PATENT DOCUMENTS

| | | |
|---|---|---|
| CN | 101763318 A | 6/2010 |
| CN | 102184211 A | 9/2011 |

(Continued)

*Primary Examiner* — Tuan A Pham
(74) *Attorney, Agent, or Firm* — Womble Bond Dickinson (US) LLP

(57) ABSTRACT

A method for file storage and a storage device are disclosed. The method includes: receiving, by a file system, a file create request sent by an application, where the file create request includes a file storage characteristic and a file storage path; selecting, by the file system from M domains based on the file storage characteristic, a domain whose domain storage characteristic has a highest degree of conformity with the file storage characteristic as a target domain; creating, by the file system, a file in the target domain; and adding, by the file system, the file to a directory tree based on the file storage path. The method can facilitate file and directory management in a storage device.

12 Claims, 6 Drawing Sheets

(56) References Cited

U.S. PATENT DOCUMENTS

| | | | |
|---|---|---|---|
| 2011/0314246 A1 | 12/2011 | Miller et al. | |
| 2013/0219176 A1* | 8/2013 | Akella | H04L 63/0435 |
| | | | 713/165 |
| 2016/0124739 A1* | 5/2016 | Zongker | G06F 8/658 |
| | | | 717/172 |

FOREIGN PATENT DOCUMENTS

| | | |
|---|---|---|
| CN | 102209088 A | 10/2011 |
| CN | 102932415 A | 2/2013 |
| CN | 104537076 A | 4/2015 |

* cited by examiner

FILE STORAGE METHOD AND STORAGE APPARATUS

CROSS-REFERENCE TO RELATED APPLICATIONS

This application is a continuation of International Application No. PCT/CN2018/086342, filed on May 10, 2018, which claims priority to China Patent 201710360832.8, filed on May 19, 2017, the disclosures of which are incorporated herein by reference in their entireties.

TECHNICAL FIELD

The present disclosure relates to the field of storage devices, and in particular, to a file storage method and a storage apparatus.

BACKGROUND

A storage system may be divided into a plurality of hierarchies including a hardware device, a driver, and a file system. As an important component of software in the storage system, the file system greatly affects a structure and a function of the storage system. In addition, an operating system and most applications mainly interact with an external storage device by using the file system. Therefore, the file system is also an essential module in the operating system.

When a file system is created on a storage device, many storage characteristic parameters may be usually configured, such as a log mode, large file optimization, and encryption, and different configurations are used in different application scenarios, so that read/write performance of the file system can be optimized, a storage space loss can be reduced, and optimal balance among performance, reliability, security, and space occupation can be achieved. However, a storage characteristic is always bound to a file system, and fails to be specified to each file. In an actual application scenario, people not only need storage characteristic optimization at a file system level, but also need storage characteristic optimization at a level of each file to enable different files to have different read/write performance, log modes, security levels, and the like. To implement n requirements by a conventional file system is to establish n file systems with different configurations, and then store a file in a specific file system that meets the requirements. Because there are n file systems in the storage device, directory and file management in the storage device is complicated.

SUMMARY

Embodiments of the present disclosure provide a file storage method and a storage apparatus, so that file and directory management in a storage device is facilitated according to the solutions in the embodiments of the present disclosure.

According to a first aspect, a method for file storage is provided. The method includes:

receiving, by a file system, a file create request sent by an application, where the file create request includes a file storage characteristic and a file storage path;

selecting, by the file system from M domains based on the file storage characteristic, a domain whose domain storage characteristic has a highest degree of conformity with the file storage characteristic as a target domain;

creating, by the file system, the file in the target domain; and adding, by the file system, the file to a directory tree based on the file storage path. The file is stored in the corresponding domain whose domain storage characteristic has a highest degree of conformity with the file storage characteristic, and a directory indicated by the file storage path is added to the directory tree, to conveniently and effectively manage files and directories in the M domains by operating one directory tree.

In one embodiment, before the receiving, by a file system, a file create request sent by an application, the method further includes:

determining, by the file system, a quantity M of domains partitioned in the storage device;

formatting, by the file system, the storage device to obtain the M domains; and setting, by the file system, a domain storage characteristic for each of the M domains. The storage device is formatted into the M domains, and the domain storage characteristic is configured for each domain, to prepare for subsequent file storage.

In one embodiment, the determining, by the file system, a quantity M of domains partitioned in the storage device specifically includes:

determining, by the file system, a quantity j of storage characteristic dimensions of the storage device and a quantity of parameters included in each storage characteristic dimension; and determining, by the file system based on a preset relational expression, the quantity M of domains partitioned in the storage device, where the preset relational expression is:

$M = N_1 \times N_2 \times \ldots \times N_i \times \ldots \times N_j$, where $N_i$ is a quantity of parameters included in an $i^{th}$ storage characteristic dimension.

In one embodiment, after the setting, by the file system, a domain storage characteristic for each of the M domains, the method further includes:

mounting, by the file system, the M domains on one directory tree. The M domains are mounted on one directory tree, to facilitate subsequent operations on directories and files in the M domains.

In one embodiment, before the adding, by the file system, the file to a directory tree based on the file storage path, the method further includes:

determining, by the file system, a quantity N of missing directories in the directory tree when determining that the directory tree does not include all directories indicated by the file storage path;

selecting, by the file system from the M domains, N domains that have a smallest quantity of storage files and directories; and creating, by the file system, the N missing directories in the N domains, and adding the N missing directories to the directory tree based on the file storage path. A directory indicated by the file storage path is added to the directory tree, to further facilitate subsequent operations on directories and files in the M domains.

According to a second aspect, a storage apparatus is provided. The storage apparatus includes:

a receiving module configured to receive a file create request sent by an application, where the file create request includes a file storage characteristic and a file storage path;

a first selecting module configured to select, from M domains based on the file storage characteristic, a domain whose domain storage characteristic has a highest degree of conformity with the file storage characteristic as a target domain;

a creating module configured to create the file in the target domain; and an adding module configured to add the file to a directory tree based on the file storage path.

In one embodiment, before the receiving module receives the file create request sent by the application, the storage apparatus further includes:

a first determining module configured to determine a quantity M of domains partitioned in the storage device;

a formatting module configured to format the storage device to obtain the M domains; and a setting module configured to set a domain storage characteristic for each of the M domains.

In one embodiment, the first determining module includes:

a first determining unit configured to determine a quantity j of storage characteristic dimensions of the storage device and a quantity of parameters included in each storage characteristic dimension; and a second determining unit configured to determine, based on a preset relational expression, the quantity M of domains partitioned in the storage device, where the preset relational expression is:

$$M = N_1 \times N_2 \times \ldots \times N_i \times \ldots \times N_j, \text{ where}$$

$N_i$ is a quantity of parameters included in an $i^{th}$ storage characteristic dimension.

In one embodiment, after the setting module sets the domain storage characteristic for each of the M domains, the storage apparatus further includes:

a mounting module configured to mount the M domains on one directory tree.

In one embodiment, before the adding module adds the file to the directory tree based on the file storage path, the storage apparatus further includes:

a second determining module configured to determine, by the file system, a quantity N of missing directories in the directory tree when determining that the directory tree does not include all directories indicated by the file storage path;

a second selecting module configured to select, from the M domains, N domains that have a smallest quantity of storage files and directories; and a creating and adding module configured to: create the N missing directories in the N domains, and add the N missing directories to the directory tree based on the file storage path.

It can be learned that in the solutions in the embodiments of the present disclosure, the file system receives the file create request sent by the application, where the file create request includes the file storage characteristic and the file storage path; the file system selects, from the M domains based on the file storage characteristic, the domain whose domain storage characteristic has a highest degree of conformity with the file storage characteristic as the target domain; the file system creates the file in the target domain; and the file system adds the file to the directory tree based on the file storage path. In comparison with the prior art, files and storage paths created in the M domains are added to one directory tree, and the files and the directories in the M domains can be conveniently and effectively managed by operating one directory tree. In addition, a directory is created in the directory tree by using a directory indicated by the file storage path, to create a directory as required, and avoid an unnecessary directory operation.

These aspects or other aspects of the present disclosure are clearer and more comprehensible in descriptions of the following embodiments.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may derive other accompanying drawings from these accompanying drawings without creative efforts.

BRIEF DESCRIPTION OF EMBODIMENTS

The following describes the embodiments of the present disclosure in detail with reference to accompanying drawings.

Figures 1, 2:
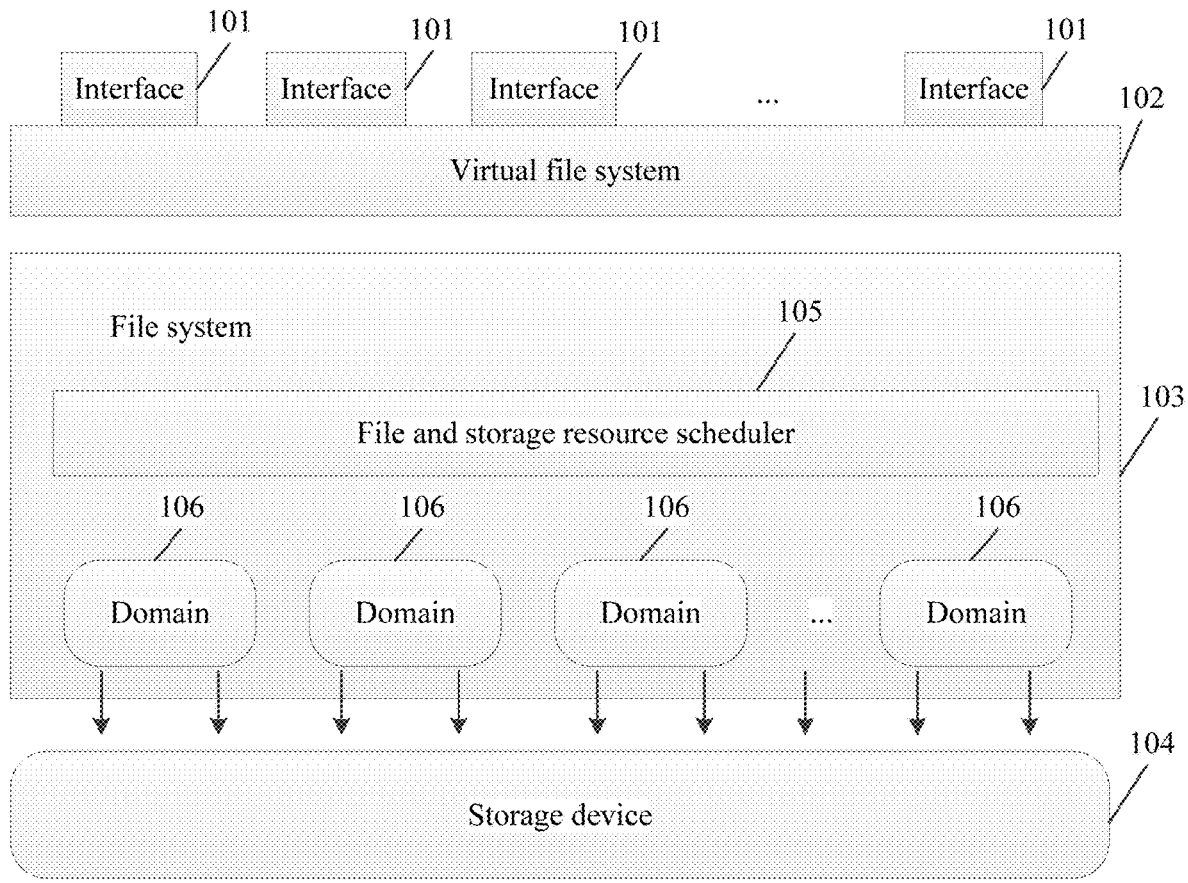
FIG. 1 is a schematic diagram of a system architecture to which a file storage method is applied according to one embodiment.
FIG. 2 is a schematic flowchart of a file storage method according to one embodiment.

FIG. 1 is a schematic diagram of a system architecture to which a file storage method is applied according to one embodiment. As shown in the figure, the system includes an interface 101, a virtual file system 102, a file system 103, and a storage device 104. The interface 101 is an interface that meets a portable operating system interface (POSIX) standard. The file system 103 includes a file and storage resource scheduler 105 and a domain 106. The file and storage resource scheduler 105 is configured to: externally interact with a virtual file system of an operating system to receive calls of various interfaces of the virtual file system; and internally manage the domain 106. The storage device 104 may be a conventional hard disk, namely, a hard disk drive (HDD), a solid state drive (SSD), a hybrid hard drive (HHD), or another storage device. The file system 103 formats the storage device 104 into a plurality of domains 106. Each domain 106 has a different storage characteristic, and these storage characteristics may include performance, a log mode, large file optimization, security, and the like.

An application sends a file create request to the virtual file system 102 through the interface 101, and the virtual file system 102 sends the file storage request to the file system 103. The file and storage resource scheduler 105 of the file system 103 selects one of the plurality of domains 106 according to the storage request to create the file in response to the file create request.

FIG. 2 is a schematic flowchart of a file storage method according to one embodiment. As shown in FIG. 2, the method includes the following steps.

S201. A file system receives a file create request sent by an application, where the file create request includes a file storage characteristic and a file storage path.

Before the file system receives the file create request sent by the application, the method further includes:

the file system determines a quantity M of domains partitioned in a storage device;

the file system formats the storage device to obtain M domains; and the file system sets a domain storage characteristic for each of the M domains.

In one embodiment, the storage device may be an HDD, an SSD, an HHD, or another storage device.

Further, the storage device is at least one of the HDD, the SSD, and the HHD.

That the file system determines a quantity M of domains partitioned in a storage device includes:

the file system determines a quantity j of storage characteristic dimensions of the storage device and a quantity of parameters included in each storage characteristic dimension; and the file system determines, based on a preset relational expression, the quantity M of domains partitioned in the storage device, where the preset relational expression is:

$$M=N_1 \times N_2 \times \ldots \times N_i \times \ldots \times N_j, \text{ where}$$

$N_i$ is a quantity of parameters included in an $i^{th}$ storage characteristic dimension.

In one embodiment, to set a domain storage characteristic for each of the M domains, the file system sets the domain storage characteristic for each of the M domains based on the storage characteristic dimensions of the storage device and each storage characteristic dimension.

For example, it is assumed that the storage characteristic includes three dimensions: performance levels, log modes, and large file optimization. The performance levels include high performance, medium performance, and low performance; the log modes include a write-back log mode, an ordered log mode, and a journal log mode; and the large file optimization includes enabled large file optimization and disabled large file optimization. In this case, $M=N_1 \times N_2 \times N_3 = 3 \times 3 \times 2 = 18$, and the file system needs to format the storage device into 18 domains. For example, a domain storage characteristic of a domain 1 in the 18 domains includes low performance, an ordered log mode, and disabled large file optimization; and a storage characteristic of a domain 2 includes medium performance, a write-back log mode, and enabled large file optimization.

For another example, it is assumed that the storage characteristic includes four dimensions: performance levels, log modes, large file optimization, and encryption. The performance levels include high performance, medium performance, and low performance; the log modes include a write-back log mode, an ordered log mode, and a journal log mode; the large file optimization includes enabled large file optimization and disabled large file optimization; and the encryption includes encrypted and unencrypted. In this case $M=N_1 \times N_2 \times N_3 \times N_4 = 3 \times 3 \times 2 \times 2 = 36$, and the file system needs to format the storage device into 36 domains. Each of the 36 domains has a different storage characteristic. For example, a domain storage characteristic of a domain 1 in the 36 domains includes high performance, a write-back log mode, enabled large file optimization, and encrypted; and a domain storage characteristic of a domain 2 includes medium performance, a journal log mode, disabled large file optimization, and encrypted.

In one embodiment, after setting the domain storage characteristic for each of the M domains, the file system mounts the M domains on one directory tree.

Specifically, the directory tree is a directory tree that includes only one root directory. That the file system mounts the M domains on one directory tree may be understood as that the file system creates a root directory in the first domain or any domain in the M domains, to mount the M domains on one root directory. The file system adds, to the root directory based on the file storage path in the file create request, a file and a directory that is indicated by the file storage path.

Figure 3:
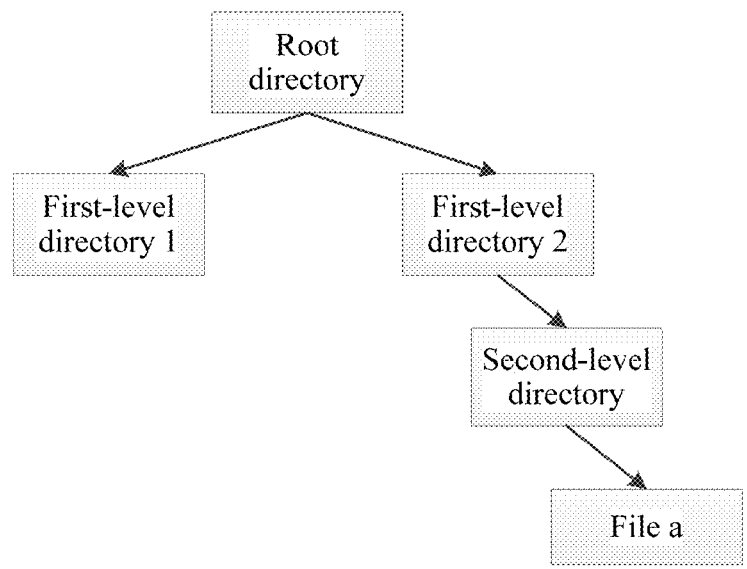
FIG. 3 is a schematic structural diagram of a directory tree.

A structure of a directory tree to which a file is added is described through an example. FIG. 3 is a schematic structural diagram of a directory tree. As shown in FIG. 3, the directory tree includes a root directory, a first-level directory 1, a first-level directory 2, a second-level directory, and a file a. It can be learned from FIG. 3 that the first-level directory 1 and the first-level directory 2 are below the root directory, the second-level directory is below the first-level directory 2, and the file a is below the second-level directory. It may also be understood that the root directory directs to the first-level directory 1 and the first-level directory 2, the first-level directory 2 directs to the second-level directory, and the second-level directory directs to the file a.

Figure 4:
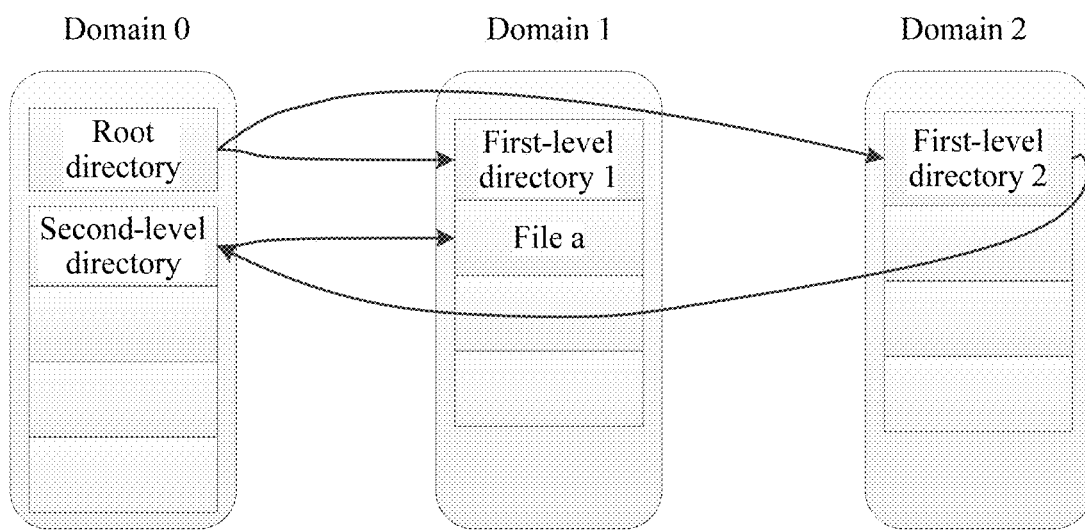
FIG. 4 is a schematic diagram of distribution of a directory tree in domains.

Distribution of the directory tree in domains is described through another example. FIG. 4 is a schematic diagram of distribution of a directory tree in domains. As shown in FIG. 4, the file system partitions the storage device into three domains: a domain 0, a domain 1, and a domain 2. In FIG. 4, the root directory and the second-level directory are located in the domain 0, the first-level directory 1 and the file a are located in the domain 1, and the first-level directory 2 is located in the domain 2. A directing relationship between the directory and the file a remains unchanged.

The application may be a database, a world wide web (or web) server, a distributed file system, or another application.

The file storage characteristic is a storage characteristic of the file, and includes performance, a log mode, large file optimization, encryption, and the like. For example, a file storage characteristic of a file 1 includes high performance, a write-back log mode, enabled large file optimization, and encrypted; a file storage characteristic of a file 2 includes medium performance, an ordered log mode, disabled large file optimization, and encrypted; and a file storage characteristic of a file 3 includes low performance, a journal log mode, and unencrypted.

The file storage path identifies a specific directory in which the file is located in the directory tree. For example, a storage path is "root directory/first-level directory 2/second-level directory" or "root directory/first-level directory 1/second-level directory".

S202. The file system selects, from M domains based on the file storage characteristic, a domain whose domain storage characteristic has a highest degree of conformity with the file storage characteristic as a target domain.

In one embodiment, to select, from M domains based on the file storage characteristic, a domain whose storage characteristic has a highest degree of conformity with the file storage characteristic, the file system compares the file storage characteristic with storage characteristics of the M domains one by one, and selects, from the M domains, the domain whose storage characteristic has a highest degree of conformity with the file storage characteristic as the target domain.

For example, it is assumed that the storage characteristics of the M domains are set based on two parameters: performance and large file optimization. In this case, M is 6. The six domains are a domain A, a domain B, a domain C, a domain D, a domain E, and a domain F. A domain storage characteristic of the domain A includes high performance and enabled large file optimization; a domain storage characteristic of the domain B includes medium performance and enabled large file optimization; a domain storage characteristic of the domain C includes low performance and enabled large file optimization; a domain storage characteristic of the domain D includes high performance and disabled large file optimization; a domain storage characteristic of the domain E includes medium performance and disabled large file optimization; and a domain storage characteristic of the domain F includes low performance and disabled large file optimization. The file storage characteristic includes medium performance, an ordered log mode, and enabled large file optimization. After comparing the file storage characteristic with the domain storage characteristics of the six domains one by one, the file system determines that the domain storage characteristic of the domain A has a highest degree of conformity with the file storage characteristic, determines the domain A as the target domain, and creates the file in the target domain.

S203. The file system creates the file in the target domain.

S204. The file system adds the file to a directory tree based on the file storage path.

Before the file system adds the file to the directory tree based on the file storage path, the method further includes:

the file system determines whether the directory tree includes all directories indicated by the file storage path;

the file system determines a quantity N of missing directories in the directory tree when determining that the directory tree does not include all the directories indicated by the file storage path;

the file system selects, from the M domains, N domains that have a smallest quantity of storage files and directories; and the file system creates the N missing directories in the N domains.

In one embodiment, before adding the file to the directory tree, the file system determines whether the directory tree includes the directories indicated by the file storage path, to determine the quantity N of missing directories in the directory tree. If the directory tree includes the directories indicated by the file storage path, after creating the file in the target domain, the file system makes a bottom directory in the directories indicated by the file storage path direct to the file; otherwise, the file system selects, from the M domains, the N domains that have a smallest quantity of storage files and directories, creates the N missing directories in the N domains, adds the N missing directories to the directory tree, and then makes the bottom directory in the directories indicated by the file storage path direct to the file, to add the file to the directory tree.

Figure 5:
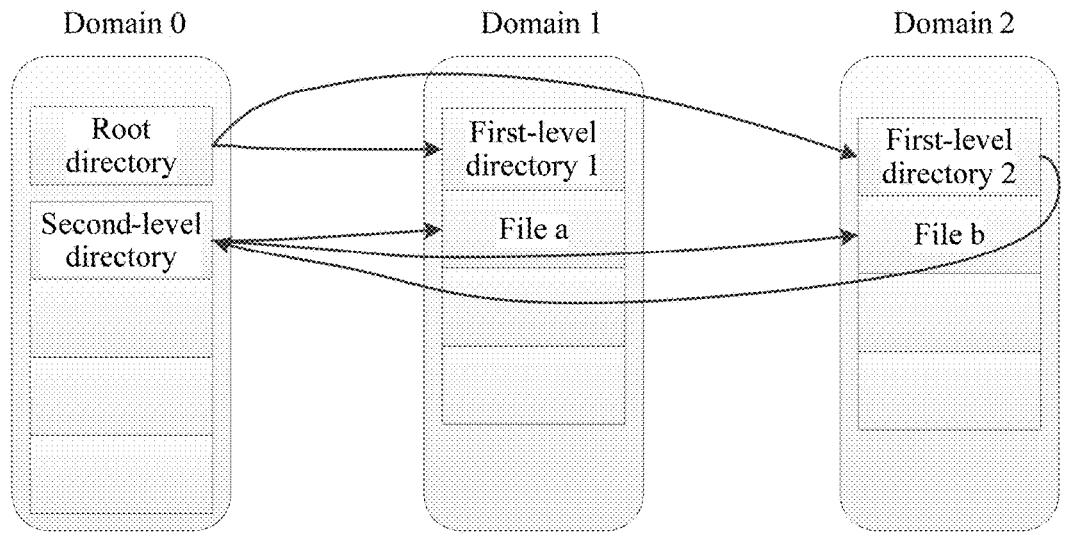
FIG. 5 is another schematic diagram of distribution of a directory tree in domains.

For example, it is assumed that distribution of the directory tree in domains is shown in FIG. 4. A file storage path of a file b is "root directory/first-level directory 2/second-level directory", and the file system creates the file b in the domain 2. The file system determines that the domain 0, the domain 1, and the domain 2 include the directories (including the root directory, the first-level directory 1, and the second-level directory) indicated by the file storage path. The file system makes the second-level directory direct to the file b, as shown in FIG. 5.

Figure 6:
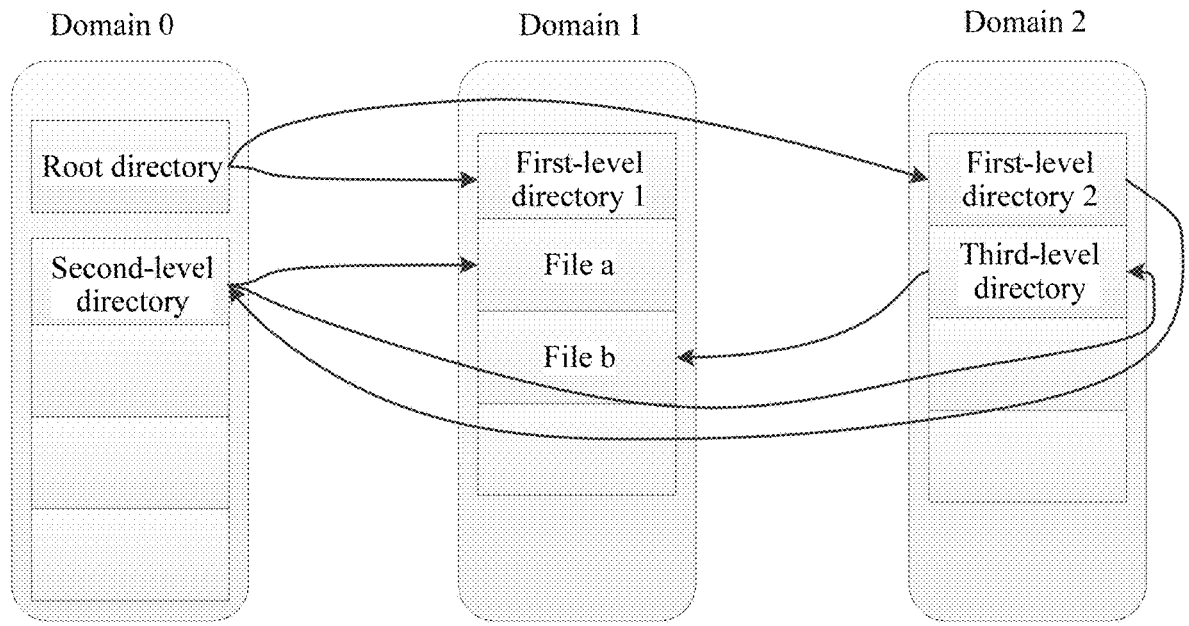
FIG. 6 is another schematic diagram of distribution of a directory tree in domains.

For another example, it is assumed that distribution of the directory tree in domains is shown in FIG. 6. A file storage path of a file b is "root directory/first-level directory 2/second-level directory/third-level directory", and the file system creates the file b in the domain 1. The file system determines that none of the domain 0, the domain 1, and the domain 2 includes the third-level directory, that is, a quantity of missing directories is 1, and the missing directory is the third-level directory. In this case, the file system creates the third-level directory in the domain 2 that has a smallest quantity of files and directories, then makes the second-level directory direct to the third-level directory and the third-level directory direct to the file b, and adds the file storage path to the directory tree, as shown in FIG. 6.

It can be learned that in the solution in this embodiment, the file system receives the file create request sent by the application, where the file create request includes the file storage characteristic and the file storage path; the file system selects, from the M domains based on the file storage characteristic, the domain whose domain storage characteristic has a highest degree of conformity with the file storage characteristic as the target domain; the file system creates the file in the target domain; and the file system adds the file to the directory tree based on the file storage path. In comparison with the prior art, files and storage paths created in the M domains are added to one directory tree, and the files and the directories in the M domains can be conveniently and effectively managed by operating one directory tree. In addition, a directory is created in the directory tree by using a directory indicated by the file storage path, to create a directory as required, and avoid an unnecessary directory operation.

Figure 7:
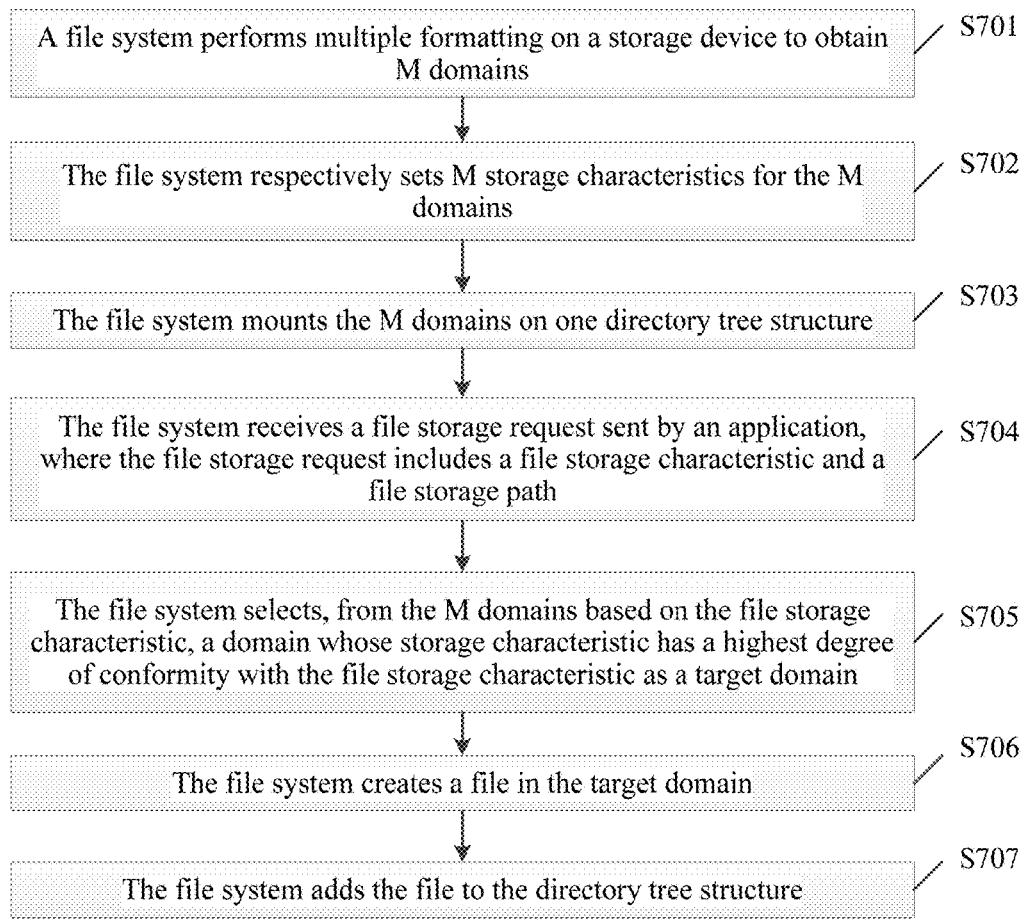
FIG. 7 is a schematic flowchart of another file storage method according to one embodiment.

FIG. 7 is a schematic flowchart of another file storage method according to one embodiment. As shown in FIG. 7, the method includes the following steps.

S701. A file system formats a storage device to obtain M domains.

In one embodiment, the storage device may be an HDD, an SSD, an HHD, or another storage device.

Further, the storage device is at least one of the HDD, the SSD, and the HHD.

In one embodiment, to format a storage device, the file system formats each of the storage devices by using proprietary formatting software in the file system, to obtain M domains. The proprietary formatting software is obtained through secondary development on open-source formatting software.

Space sizes of the M domains may be the same or different.

It should be noted that each of the storage devices may be formatted into at least one domain, and the storage devices may be formatted into M domains. The M domains are uniformly managed by the file system, thereby implementing unified joint access to heterogeneous storage devices.

Figure 8:
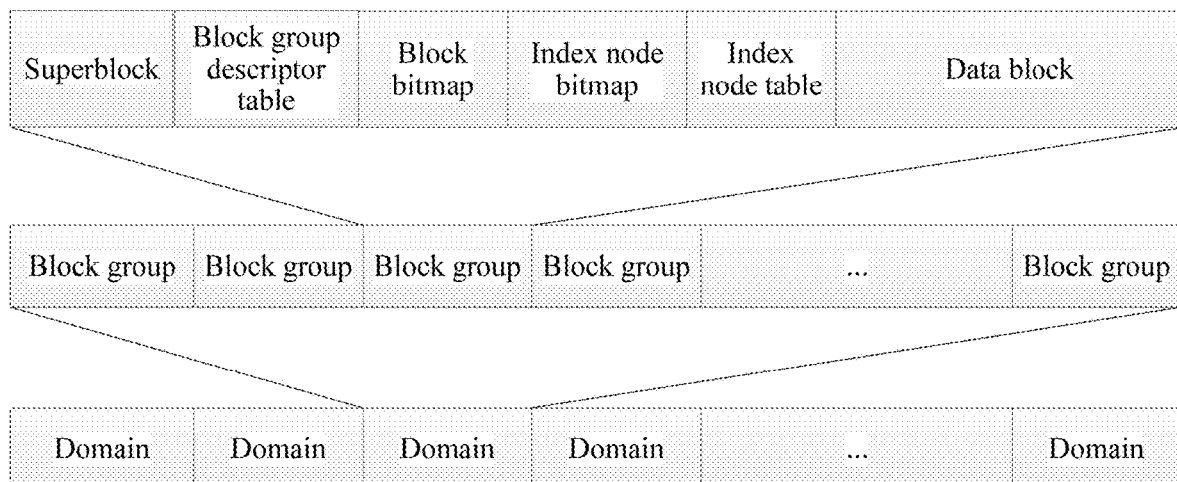
FIG. 8 is a schematic diagram of a disk data structure.

For a disk data structure in the storage device, refer to FIG. 8. FIG. 8 is a schematic diagram of a disk data structure. As shown in FIG. 8, any one of the M domains may be divided into a plurality of block groups. Any one of the plurality of block groups may be further divided into a superblock (SB), a block group descriptor table (GDT), a block bitmap (BB), an index node bitmap (Inode Bitmap or IB), an index node table (Inode Table or IT), and a data block.

In one embodiment, the block group is a largest division unit below a storage device or a partition, sizes of all block groups are the same (generally, 128 MB), and each block group includes metadata and a data block. The metadata includes an SB, a GDT, a BB, an IB and an IT.

The SB is a special superblock of an Ext4 file system, and is different from a general superblock of a virtual file system. The SB stores metadata of an entire file system, such as a file system version number, a time of last mounting, and a size of a data block. The superblock is very important metadata information, and is usually backed up in another block group. The GDT includes a block group descriptor in each block group. The block group descriptor stores metadata of the block group, such as quantities of idle data blocks and index nodes, a start address of a data block, and a start address of an index node table.

The block group descriptor table is also backed up at start locations of some block groups. The BB is used to record specific occupation of a data block in a block group in which the BB is located, each bit of the BB represents one data block, a size of the BB is one data block, and the data block is set to 1 in an occupied state and is set to 0 in an idle state. The IB functions the same as the BB, and also has a size of one data block, and each bit of the IB represents occupation of a corresponding index node. The IT includes specific index nodes in the block group. The data block is used to store data of a conventional file.

S702. The file system respectively sets M storage characteristics for the M domains.

Because the M domains have different domain storage characteristics, the quantity M of domains is related to the storage characteristic.

For example, it is assumed that the storage characteristic includes three dimensions: three performance levels, three log modes, and large file optimization. The three performance levels include high performance, medium performance, and low performance; the three log modes include a write-back log mode, an ordered log mode, and a journal log mode; and the large file optimization includes enabled large file optimization and disabled large file optimization. In this case, M=3×3×2=18, and the file system needs to format the storage device into 18 domains. For example, a domain storage characteristic of a domain 1 in the 18 domains includes low performance, an ordered log mode, and disabled large file optimization; and a domain storage characteristic of a domain 2 is medium performance, a write-back log mode, and enabled large file optimization.

For another example, it is assumed that the storage characteristic includes four parameters: three performance levels, log modes, large file optimization, and encryption. The three performance levels include high performance, medium performance, and low performance; the three log modes include a write-back log mode, an ordered log mode, and a journal log mode; the large file optimization includes enabled large file optimization and disabled large file optimization; and the encryption includes encrypted and unencrypted. In this case, M=3×3×2×2=36, and the file system needs to format the storage device into 36 domains. Each of the 36 domains has a different storage characteristic. For example, a domain storage characteristic of a domain 1 in the 36 domains includes high performance, a write-back log mode, enabled large file optimization, and encrypted; and a domain storage characteristic of a domain 2 includes medium performance, a journal log mode, disabled large file optimization, and encrypted.

It should be noted that in formatting and mounting processes, the file system specifies different storage characteristic parameter combinations for the M domains to enable each of the M domains to have a different domain storage characteristic. For example, during formatting, the file system adds or does not add a parameter -O bigalloc to specify whether a large file optimization operation is performed in the domains; and during mounting, the file system selects different storage characteristic parameter values -o data=writeback/ordered/journal to specify corresponding log modes for the domains.

S703. The file system mounts the M domains on one directory tree.

The directory tree is a directory tree that includes only one root directory. In one embodiment, to mount the M domains on one directory tree, the file system randomly selects a domain from the M domains and creates a root directory in the domain, or creates a root directory in the first domain in the M domains. The file system adds, to the root directory based on a file storage path in a file create request, a file and a directory that is indicated by the file storage path.

A structure of a directory tree to which a file is added is described through an example. FIG. 3 is a schematic structural diagram of a directory tree. As shown in FIG. 3, the directory tree includes a root directory, a first-level directory 1, a first-level directory 2, a second-level directory, and a file a. It can be learned from FIG. 3 that the first-level directory 1 and the first-level directory 2 are below the root directory, the second-level directory is below the first-level directory 2, and the file a is below the second-level directory. It may also be understood that the root directory directs to the first-level directory 1 and the first-level directory 2, the first-level directory 2 directs to the second-level directory, and the second-level directory directs to the file a.

In one embodiment, to mount the M domains on one directory tree, the file system distributes directories and files in the directory tree to the M domains.

Distribution of the directory tree in domains is described through an example. FIG. 4 is a schematic diagram of distribution of a directory tree in domains. As shown in FIG. 6, the file system partitions the storage device into three domains: a domain 0, a domain 1, and a domain 2. In FIG. 4, the root directory and the second-level directory are located in the domain 0, the first-level directory 1 and the file are located in the domain 1, and the first-level directory 2 is located in the domain 2. A directing relationship between the directory and the file a remains unchanged.

S704. The file system receives a file create request sent by an application, where the file create request includes a file storage characteristic and a file storage path.

The application may be a database, a world wide web (or web) server, a distributed file system, or another application.

The file storage characteristic is a storage characteristic of the file, and includes performance, a log mode, large file optimization, encryption, and the like. For example, a file storage characteristic of a file 1 includes high performance, a write-back log mode, enabled large file optimization, and encrypted; a file storage characteristic of a file 2 includes medium performance, an ordered log mode, disabled large file optimization, and encrypted; and a file storage characteristic of a file 3 includes low performance, a journal log mode, and unencrypted.

The file storage path identifies a specific directory in which the file is located in the directory tree. For example, a storage path is "root directory/first-level directory 2/second-level directory" or "root directory/first-level directory 1/second-level directory".

S705. The file system selects, from the M domains based on the file storage characteristic, a domain whose storage characteristic has a highest degree of conformity with the file storage characteristic as a target domain.

In one embodiment, to select, from the M domains based on the file storage characteristic, a domain whose storage characteristic has a highest degree of conformity with the file storage characteristic, the file system compares the file storage characteristic with the storage characteristics of the M domains one by one, and selects, from the M domains, the domain whose storage characteristic has a highest degree of conformity with the file storage characteristic as the target domain.

For example, it is assumed that the storage characteristics of the M domains are set based on two parameters: performance and large file optimization. In this case, M is 6. The six domains are a domain A, a domain B, a domain C, a domain D, a domain E, and a domain F. A domain storage characteristic of the domain A includes high performance and enabled large file optimization; a domain storage characteristic of the domain B includes medium performance and enabled large file optimization; a domain storage characteristic of the domain C includes low performance and enabled large file optimization; a domain storage characteristic of the domain D includes high performance and disabled large file optimization; a domain storage characteristic of the domain E includes medium performance and disabled large file optimization; and a domain storage characteristic of the domain F includes low performance and disabled large file optimization. The file storage characteristic includes medium performance, an ordered log mode, and enabled large file optimization. After comparing the file storage characteristic with the domain storage characteristics of the six domains one by one, the file system determines that the domain storage characteristic of the domain A has a highest degree of conformity with the file storage characteristic, determines the domain A as the target domain, and creates the file in the target domain.

S706. The file system creates the file in the target domain.

S707. The file system adds the file to the directory tree structure.

Before adding the file to the directory tree, the file system determines whether the directory tree includes directories indicated by the file storage path. If the directory tree includes the directories indicated by the file storage path, after creating the file in the target domain, the file system makes a bottom directory in the directories indicated by the file storage path direct to the file; otherwise, the file system selects, from the M domains, N domains that have a smallest quantity of storage files and directories, creates the directories indicated by the file storage path in the N domains, and then makes the bottom directory in the directories indicated by the file storage path direct to the file, to add the file to the directory tree. A value of N is related to a quantity of directories to be created.

For example, it is assumed that distribution of the directory tree in domains is shown in FIG. 4. A file storage path of a file b is "root directory/first-level directory 2/second-level directory", and the file system creates the file b in the domain 2. The file system determines that the domain 0, the domain 1, and the domain 2 include the directories (including the root directory, the first-level directory 1, and the second-level directory) indicated by the file storage path. The file system makes the second-level directory direct to the file b, as shown in FIG. 5.

For another example, it is assumed that distribution of the directory tree in domains is shown in FIG. 6. A file storage path of a file b is "root directory/first-level directory 2/second-level directory/third-level directory", and the file system creates the file b in the domain 1. The file system determines that none of the domain 0, the domain 1, and the domain 2 includes the third-level directory. In this case, the file system creates the third-level directory in the domain 2 that has a smallest quantity of files and directories, and then makes the second-level directory direct to the third-level directory and the third-level directory direct to the file b, as shown in FIG. 6.

Figure 9:
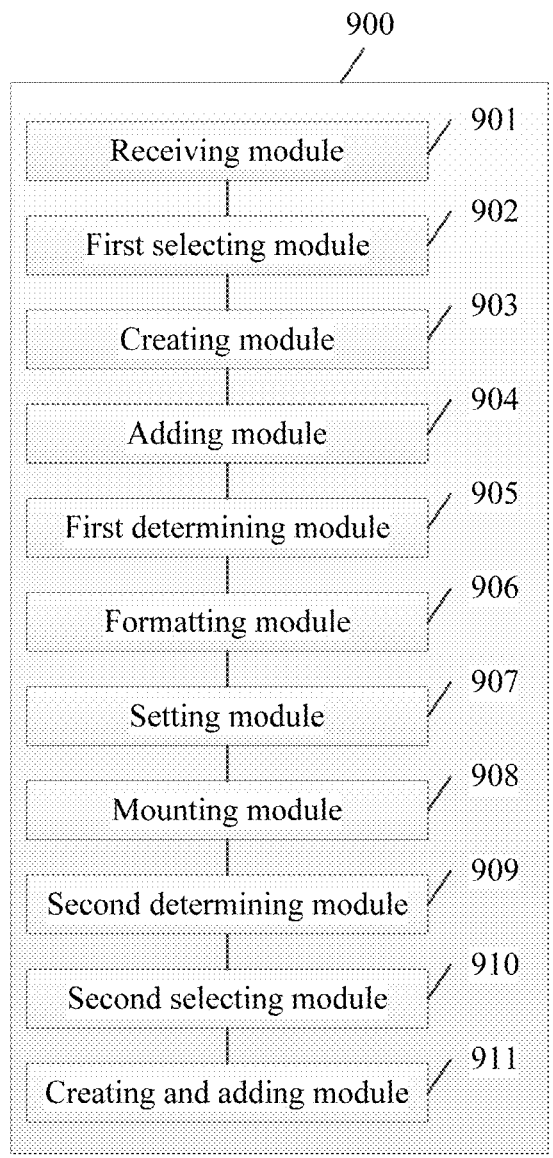
FIG. 9 is a schematic structural diagram of a storage apparatus according to one embodiment.
Figure 10:
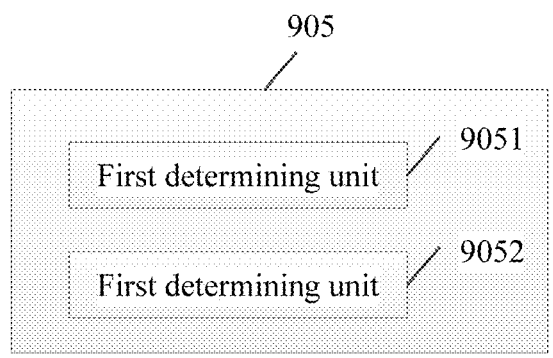
FIG. 10 is a schematic structural diagram of a part of a storage apparatus according to one embodiment.

FIG. 9 is a schematic structural diagram of a storage apparatus according to one embodiment. As shown in FIG. 9, the storage apparatus 900 includes:

a receiving module 901 configured to receive a file create request sent by an application, where the file create request includes a file storage characteristic and a file storage path.

In one embodiment, before the receiving module receives the file create request sent by the application, the storage apparatus 900 further includes:

a first determining module 905 configured to determine a quantity M of domains partitioned in the storage device;

a formatting module 906 configured to format the storage device to obtain M domains; and a setting module 907 configured to set a domain storage characteristic for each of the M domains.

In one embodiment, the first determining module 905 includes:

a first determining unit 9051 configured to determine a quantity j of storage characteristic dimensions of the storage device and a quantity of parameters included in each storage characteristic dimension; and a second determining unit 9052 configured to determine, based on a preset relational expression, the quantity M of domains partitioned in the storage device, where the preset relational expression is:

$$M = N_1 \times N_2 \times \ldots \times N_i \times \ldots \times N_j, \text{ where}$$

$N_i$ is a quantity of parameters included in an $i^{th}$ storage characteristic dimension.

In one embodiment, after the setting module 907 sets the domain storage characteristic for each of the M domains, the storage apparatus 900 further includes:

a mounting module 908 configured to mount the M domains on one directory tree.

The storage apparatus 900 further includes: a first selecting module 902 configured to select, from the M domains based on the file storage characteristic, a domain whose domain storage characteristic has a highest degree of conformity with the file storage characteristic as a target domain;

a creating module 903 configured to create the file in the target domain; and an adding module 904 configured to add the file to a directory tree based on the file storage path.

In one embodiment, before the adding module 904 adds the file to the directory tree based on the file storage path, the storage apparatus 900 further includes:

a second determining module 909 configured to determine, by the file system, a quantity N of missing directories in the directory tree when determining that the directory tree does not include all directories indicated by the file storage path;

a second selecting module 910 configured to select, from the M domains, N domains that have a smallest quantity of storage files and directories; and a creating and adding module 911 configured to: create the N missing directories in the N domains, and add the N missing directories to the directory tree based on the file storage path.

It should be noted that the foregoing modules (the receiving module 901, the first selecting module 902, the creating module 903, the adding module 904, the first determining module 905, the formatting module 906, the setting module 907, the mounting module 908, the second determining module 909, the second selecting module 910, and the creating and adding module 911) are configured to perform related steps of the foregoing method.

In this embodiment, the storage apparatus 900 is presented in a form of a module. The "module" herein may be an application-specific integrated circuit (ASIC), a processor and a memory that execute one or more software or firmware programs, an integrated logic circuit, and/or another component that can provide the foregoing function.

Figure 11:
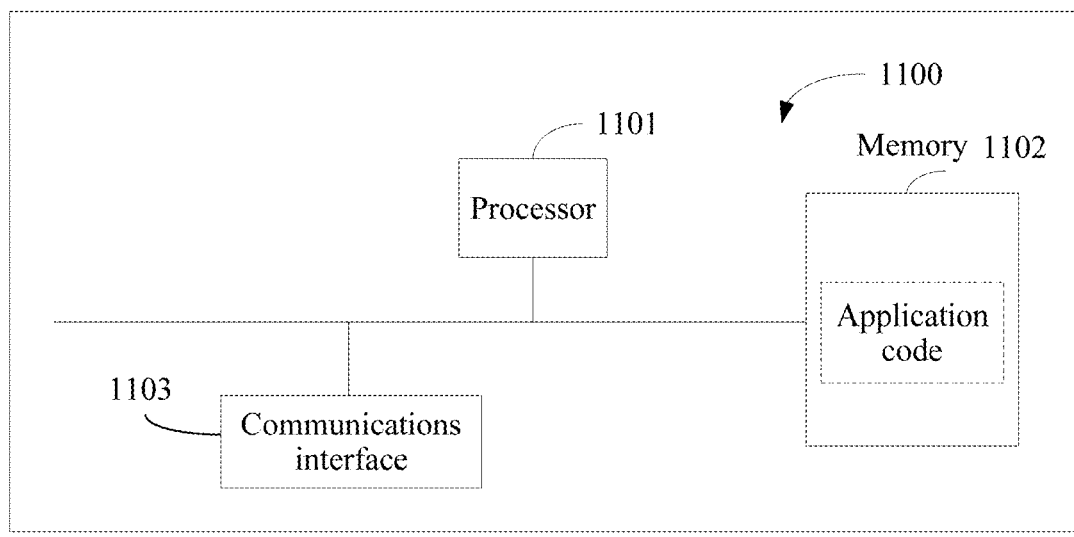
FIG. 11 is a schematic structural diagram of another storage apparatus according to one embodiment.

As shown in FIG. 11, a storage apparatus 1100 may be implemented by using a structure in FIG. 11. The memory 1100 includes at least one controller 1101, at least one data memory 1102, and at least one communications interface 1103. The controller 1101, the 1102, and the communications interface 1003 are connected and communicate with each other through the communications bus.

The processor 1101 may be a general-purpose central processing unit (CPU), a microprocessor, an application-specific integrated circuit (ASIC), or one or more integrated circuits for controlling program execution of the foregoing solution.

The communications interface 1103 is configured to communicate with another device or a communications network, such as an Ethernet, a radio access network (RAN), or a wireless local area network (WLAN).

The memory 1102 may be a read-only memory (ROM) or another type of static storage device that can store static information and an instruction, or a random access memory (RAM) or another type of dynamic storage device that can store information and an instruction; or may be an electrically erasable programmable read-only memory (EEPROM), a compact disc read-only memory (CD-ROM) or another compact disc memory, an optical disc memory (including a compact optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that may be accessed by a computer. However, the memory 1102 is not limited thereto. The memory 1102 may exist independently, and is connected to the processor through the bus. Alternatively, the memory 1102 may be integrated with the processor.

The memory 1102 is configured to store application code for executing the foregoing solution, and the processor 1101 controls the execution. The processor 1101 is configured to execute the application code stored in the memory 1102.

The code stored in the memory 1102 may be used to perform the file storage method performed by the terminal device provided above. For example, a file system receives a file create request sent by an application, where the file create request includes a file storage characteristic and a file storage path; the file system selects, from M domains based on the file storage characteristic, a domain whose domain storage characteristic has a highest degree of conformity with the file storage characteristic as a target domain; the file system creates the file in the target domain; and the file system adds the file to a directory tree based on the file storage path.

An embodiment of the present disclosure further provides a computer storage medium. The computer storage medium may store a program, and when the program is executed, some or all of the steps of any file storage method in the foregoing method embodiments are performed.

It should be noted that, to make the description brief, the foregoing method embodiments are expressed as a combination of a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the involved actions and modules are not necessarily required by the present disclosure.

In the foregoing embodiments, the description of each embodiment has respective focuses. For a part that is not described in detail in an embodiment, refer to related descriptions in other embodiments.

In the several embodiments provided in this application, it should be understood that the disclosed storage apparatus may be implemented in other manners. For example, the described storage apparatus embodiments are merely examples. For example, the unit division is merely logical function division and there may be other divisions in actual implementation. For example, a plurality of units or components may be combined or integrated into another system, or some characteristics may be ignored or not performed. In addition, the displayed or discussed mutual couplings or direct couplings or communication connections may be implemented through some interfaces. The indirect couplings or communication connections between the storage apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable memory. Based on such an understanding, the technical solutions of the present disclosure essentially, or the part contributing to the prior art, or all or some of the technical solutions may be implemented in the form of a software product. The computer software product is stored in a storage and includes several instructions to instruct a computer device (which may be a personal computer, a server, a network device, or the like) to perform all or some of the steps of the methods described in the embodiments of the present disclosure. The foregoing memory includes: any medium that can store program code, such as a USB flash drive, a read-only memory (ROM), a random access memory (RAM), a removable hard disk, a magnetic disk, or an optical disc.

A person of ordinary skill in the art may understand that all or some of the steps of the methods in the embodiments may be implemented by a program instructing related hardware. The program may be stored in a computer readable memory. The memory may include a flash memory, a read-only memory (ROM), a random access memory (RAM), a magnetic disk, and an optical disc.

The embodiments of the present disclosure are described in detail above. The principle and implementation of the present disclosure are described herein through specific examples. The description about the embodiments of the present disclosure is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A method for file storage, comprising:
   receiving, by a file system, a file create request sent by an application, wherein the file create request comprises a file storage characteristic and a file storage path;
   selecting, by the file system from a plurality of domains based on the file storage characteristic, a target domain whose domain storage characteristic has a highest degree of conformity with the file storage characteristic;
   creating, by the file system, a file in the target domain; and
   adding, by the file system, the file to a directory tree based on the file storage path;
   wherein before adding the file to the directory tree based on the file storage path, the method further comprises:
   determining, by the file system, a quantity of missing directories in the directory tree when determining that the directory tree does not comprise all directories indicated by the file storage path;
   selecting, by the file system from the plurality of domains, domains that have a smallest quantity of storage files and directories; and
   creating, by the file system, the missing directories in the domains that have the smallest quantity of storage files and directories, and adding the missing directories to the directory tree based on the file storage path.

2. The method according to claim 1, further comprising: before receiving the file create request sent by the application,
   determining, by the file system, a quantity of domains partitioned in a storage device;
   formatting, by the file system, the storage device to obtain the plurality of domains; and
   setting, by the file system, a domain storage characteristic for each of the plurality of domains.

3. The method according to claim 2, wherein determining the quantity of domains partitioned in the storage device comprises:
   determining, by the file system, a quantity of storage characteristic dimensions of the storage device and a quantity of parameters comprised in each storage characteristic dimension; and
   determining, by the file system based on a preset relational expression, the quantity of domains partitioned in the storage device, wherein the preset relational expression is:

$M = N_1 \times N_2 \times \ldots \times N_i \times \ldots \times N_j$, wherein

M is the quantity of domains partitioned in the storage device,
   j is the quantity of storage characteristic dimensions of the storage device,
   $N_i$ is a quantity of parameters comprised in an $i^{th}$ storage characteristic dimension, and
   $N_j$ is a quantity of parameters comprised in a $j^{th}$ storage characteristic dimension.

4. The method according to claim 2, further comprising: after setting the domain storage characteristic for each of the plurality of domains,
   mounting, by the file system, the plurality of domains on one directory tree.

5. A computer system, comprising
   a storage medium configured to store instructions; and
   one or more processors configured to read the instructions to perform operations, the operations comprising:
   receiving a file create request sent by an application, wherein the file create request comprises a file storage characteristic and a file storage path;
   selecting, from a plurality of domains based on the file storage characteristic, a target domain whose domain storage characteristic has a highest degree of conformity with the file storage characteristic;
   creating a file in the target domain; and
   adding the file to a directory tree based on the file storage path;
   wherein before adding the file to the directory tree based on the file storage path, the operations further comprise:
   determining a quantity of missing directories in the directory tree when determining that the directory tree does not comprise all directories indicated by the file storage path;
   selecting, from the plurality of domains, domains that have a smallest quantity of storage files and directories; and
   creating the missing directories in the domains that have the smallest quantity of storage files and directories, and adding the missing directories to the directory tree based on the file storage path.

6. The computer system of claim 5, wherein the operations further comprise:
   determining a quantity of domains partitioned in a storage device;
   formatting the storage device to obtain the plurality of domains; and
   setting a domain storage characteristic for each of the plurality of domains.

7. The computer system of claim 6, wherein determining the quantity of domains partitioned in the storage device comprises:
   determining a quantity of storage characteristic dimensions of the storage device and a quantity of parameters comprised in each storage characteristic dimension; and
   determining based on a preset relational expression, the quantity of domains partitioned in the storage device, wherein the preset relational expression is:

$M = N_1 \times N_2 \times \ldots \times N_i \times \ldots \times N_j$, wherein

M is the quantity of domains partitioned in the storage device,
   j is the quantity of storage characteristic dimensions of the storage device,
   $N_i$ is a quantity of parameters comprised in an $i^{th}$ storage characteristic dimension, and
   $N_j$ is a quantity of parameters comprised in a $j^{th}$ storage characteristic dimension.

8. The computer system of claim 6, wherein the operations further comprise:
   mounting the plurality of domains on one directory tree.

9. A non-transitory storage medium, comprising instructions when performed by one or more processors cause the one or more processors to:

receive a file create request sent by an application, wherein the file create request comprises a file storage characteristic and a file storage path;

select, from a plurality of domains based on the file storage characteristic, a target domain whose domain storage characteristic has a highest degree of conformity with the file storage characteristic;

create a file in the target domain; and add the file to a directory tree based on the file storage path;

wherein before adding the file to the directory tree based on the file storage path, the instructions when performed by the one or more processors further cause the one or more processors to:

determine a quantity of missing directories in the directory tree when determining that the directory tree does not comprise all directories indicated by the file storage path;

select, from the plurality of domains, domains that have a smallest quantity of storage files and directories; and create the missing directories in the domains that have the smallest quantity of storage files and directories, and adding the missing directories to the directory tree based on the file storage path.

10. The non-transitory storage medium of claim 9, wherein the instructions when performed by the one or more processors further cause the one or more processors to:

determine a quantity of domains partitioned in a storage device;

format the storage device to obtain the plurality of domains; and set a domain storage characteristic for each of the plurality of domains.

11. The non-transitory storage medium of claim 10, wherein to determine the quantity of domains partitioned in the storage device, the one or more processors are further to:

determine a quantity of storage characteristic dimensions of the storage device and a quantity of parameters comprised in each storage characteristic dimension; and determine based on a preset relational expression, the quantity of domains partitioned in the storage device, wherein the preset relational expression is:

$M = N_1 \times N_2 \times \ldots \times N_i \times \ldots \times N_j$, wherein

M is the quantity of domains partitioned in the storage device, j is the quantity of storage characteristic dimensions of the storage device, $N_i$ is a quantity of parameters comprised in an $i^{th}$ storage characteristic dimension, and $N_j$ is a quantity of parameters comprised in a $j^{th}$ storage characteristic dimension.

12. The non-transitory storage medium of claim 10, wherein the instructions when performed by the one or more processors further cause the one or more processors to:

mount the plurality of domains on one directory tree.

* * * * *